(12) United States Patent
Dahme

(10) Patent No.: US 6,850,813 B1
(45) Date of Patent: Feb. 1, 2005

(54) METHOD OF PRODUCING A WOBBLE DIE

(75) Inventor: Michael Dahme, Kaufering (DE)

(73) Assignee: Hirschvogel Umformtechnik, Denklingen (DE)

( * ) Notice: Subject to any disclaimer, the term of this patent is extended or adjusted under 35 U.S.C. 154(b) by 0 days.

(21) Appl. No.: 09/958,392

(22) PCT Filed: Feb. 21, 2000

(86) PCT No.: PCT/EP00/01400
§ 371 (c)(1),
(2), (4) Date: Jan. 16, 2002

(87) PCT Pub. No.: WO00/61318
PCT Pub. Date: Oct. 19, 2000

(30) Foreign Application Priority Data

Apr. 8, 1999 (DE) .......................................... 199 15 758

(51) Int. Cl.$^7$ ............................. B21J 9/02; G06F 19/00
(52) U.S. Cl. ..................... 700/182; 700/90; 700/159; 700/179; 72/115; 706/919
(58) Field of Search ........................... 700/90, 95, 145, 700/159, 179, 182; 72/67, 115; 706/919

(56) References Cited

U.S. PATENT DOCUMENTS 5,398,536 A * 3/1995 Schlatter ...................... 72/406

FOREIGN PATENT DOCUMENTS

| DE | 196 37 839 | | 10/1997 | ............ B21K/1/46 |
|----|------------|----|---------|---------------------|
| EP | 1 186 363 | A1 * | 3/2002 | |
| JP | 61-202740 | | 9/1986 | ............. B21J/9/02 |
| JP | 6-285576 | | 10/1994 | ............ B21J/13/02 |
| JP | 6-320345 | | 11/1994 | ............ B23H/9/00 |
| WO | WO 00/61317 | * | 10/2000 | |

OTHER PUBLICATIONS

English translation of the International Preliminary Examination Report for Application No. PCT/EP00/01400, filed Feb. 21, 2000.

* cited by examiner

Primary Examiner—Jayprakash N. Gandhi
(74) Attorney, Agent, or Firm—Marshall, Gerstein & Borun LLP

(57) ABSTRACT

The invention relates to a method of manufacturing a wobble die (9) for shaping the internal contour or the external contour of a workpiece (4) in a wobble process. Thereby a wobble movement is initially selected. The three-dimensional geometry of the workpiece (4) is described. From the three-dimensional geometry of the workpiece (4) there is prescribed a virtual die (5), the shape of which corresponds in substance to the negative geometry of the workpiece (4). The virtual die (5) is deformed, taking into account the parameters of the selected wobble movement, to a geometry describing the wobble die (9). Finally, a wobble die (9) is produced on the basis of the geometry obtained in the preceding step.

11 Claims, 7 Drawing Sheets

METHOD OF PRODUCING A WOBBLE DIE

TECHNICAL FIELD

The present invention relates to a method of manufacturing a wobble.

BACKGROUND

Wobble dies find employment in the shaping or finishing of workpieces, in particular with such workpieces that have a non-rotationally symmetric geometry and/or undercuts. In German patent DE 196 37 839 there is described for example the working of the ball raceways and cage guide surfaces of an outer part of a Rzeppa constant velocity joint by means of a wobble die. With the method there described, initially a wobble die, segment-wise differently convexly curved, is introduced into a hollow chamber of a preliminary workpiece. Due to different curvatures of the segments, the wobble die has rib-like contours on its outer surface, which find employment for working the ball raceways. Then, the wobble die is set into a wobble movement whereby it rolls over the surfaces of the preliminary workpiece which are to be shaped in a plurality of circular orbits.

With the methods described in DE 196 44 639 of a workpiece is worked. Here there is involved a ratchet wheel and coaxially arranged and axially projecting ratchet teeth which have an axial undercut. Here also, the wobble die and the preliminary workpiece are set into a wobbling circular motion relative to the contours of the wobble die move over the outside of the preliminary workpiece shaping manner.

For the wobble movement, various kinds of movement are conceivable which will be briefly explained below with reference to FIGS. 1 and 2. During the placing or removal of the wobble die, the preliminary workpiece and the wobble die are oriented in common along a main axis 1.

During the movement, the wobble axis 2—if the wobble die alone is set into motion, this corresponds to the middle axis of the die—is pivoted out with respect to the central axis by the wobble angle α. The wobble axis 2 always goes through the wobble point 3, that is, this wobble point 3 is the neutral centre of the wobble movement. The different kinds of movement are illustrated by means of a point on the wobble axis 2 which point moves with this axis. Four different kinds of movement are illustrated in FIGS. 2a to 2d. The circular movement (FIG. 2a) is suitable for example for the working of annular undercuttings. With the linear movement (FIG. 2b) a pendulum motion is carried out, whereby the angle β, which is enclosed by a predetermined plane of the wobble press and the pendulum plane, can be set to any desired value. A working of the workpiece at regular spacings is attained by means of the loop-like movement of FIG. 2c. Finally, FIG. 2d shows a spiral-shape wobble movement, with which the pressing force of the die can be continuously reduced or increased.

For the generation of such wobble movements there are suitable many kinds of wobble presses, which are classified into several types in accordance with their die movements.

With the wobble press of type 1, a lower die with the workpiece placed therein carries out a driven rotational movement around the machine axis. The wobble press die rotates therewith around the wobble axis inclined by the wobble angle α, synchronously to the rotational movement of the lower die. A translational movement, which corresponds to a stroke movement during the forming process, is likewise introduced by means of the wobble press die press die hydraulically. This translational movement is carried out in order to hold the wobble press die 4 at each point in time at a suitable height with respect to the workpiece 1. If the rotational movement of the wobble press die is not driven, i.e. the die rotates freely around the wobble axis together with the workpiece, one speaks of the wobble press type 1A. If, in contrast, the rotational movement of the wobble press die is additionally driven, this is called a wobble press type 1B.

The wobble press of type 2 has a fixed lower die which can carry out neither translational nor rotational movements. The workpiece is stationary during the entire working process. In this case the wobble press die carries out three movements overall, a rotation around the wobble axis, a wobble movement around the machine axis, and the hydraulically driven stroke movement in the axial direction.

Type 3 common wobble presses represent, in contrast, the most kind of wobble press. Here, the hydraulically stroke movement is effected by means of a cylinder in the lower part of the machine. The axial translational movement is thus carried out by means of the outer die. The wobble movement is introduced by means of the wobble press die, lower die and workpiece remaining stationary with regard to the rotational movement.

In general it is to be noted that the wobble point—considered mathematically—may also be infinitely distant, which leads to a rolling movement. This rolling movement thus represents an extreme case of a wobble movement.

The shape of the wobble die is dependent on the one hand on the desired contour of the preliminary workpiece. Thereby it must be ensured that the wobble die can be put and again removed without problem, before and after the wobble process. For the working of the bellshaped outer part of a Rzeppa constant velocity joint this means, for example, that the maximum cross-section of the wobble die may not be greater than the opening. This problem arises in general whenever undercuttings are to be worked with the wobble die. Further, in the configuration of the wobble die, the wobble movement must be taken into account, whereby not every wobble movement is suitable for working a desired structure. For example, the wobble angle α is dependent also upon the depth of the ball raceways which are to be shaped. Further, during the wobble process, elastic deformations may appear on the workpiece and die, so that the actually attained result deviates from the theoretically calculated.

SUMMARY OF THE INVENTION

In a method according to a preferred embodiment of the invention, a die, the shape of which corresponds to the negative shape of the finished workpiece, is deformed to a wobble die taking into consideration the parameters of the wobble movement.

Thus, in accordance with an alternate preferred embodiment of the invention, the method can in particular be extended to an iterative method in which—taking into consideration deviations between the desired and the actually attained workpiece—the shape of the wobble die stepwise so altered that these deviations are smaller. Individual steps of the method may thereby be carried out in a computer supported manner.

BRIEF DESCRIPTION OF THE DRAWINGS

Below, the method in accordance with the invention will be explained in more detail with reference to the accompanying drawings. There is shown:

FIG. 3c a workpiece to be generated;

DETAILED DESCRIPTION OF THE PREFERRED EMBODIMENTS

A first exemplary embodiment of a method for manufacturing a wobble die will first be explained with reference to FIGS. 3 to 7. The six steps of this method are illustrated in the flow diagram of FIG. 3.

In the first step 100 of the method there is effected the exact description of the three-dimensional geometry of the workpiece to be generated. This is effected most simply with the aid of a CAD program. In the second step 101 there is effected the derivation of a so-called virtual die, that is a die the shape of which corresponds in substance to the negative shape of the workpiece to be generated. The description also of this virtual die is effected preferably with the aid of the CAD program. The geometry of this virtual die is, in the following step 102, described by means of a collection of points. This means that the surface of the virtual die is represented by the three-dimensional coordinates of a finite number of surface points. The significant method step is the following step 103. Here, the collection of points is so deformed, taking into account the parameters of the wobble movement—that is taking into account the wobble angle, the disposition of the wobble point and the kind of movement—that the collection of points now describes the structure of the desired wobble die. This has the same significance as a reverse transformation of the coordinates of the surface points corresponding to their deflection during the wobbling. Finally, with the aid of this collection of points, in step 104 an NC program is derived, and the wobble die prepared in step 105.

Figure 1:
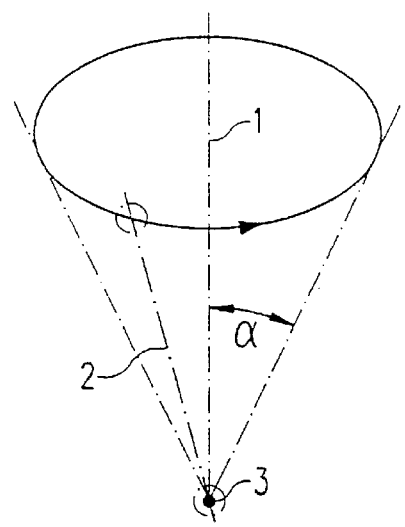
FIG. 1 a schematic for definition of the parameters of the wobble movement.
Figure 2A:
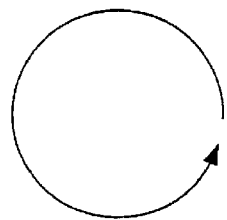
FIG. 2a-2d four different kinds of wobble movement.
Figure 2B:
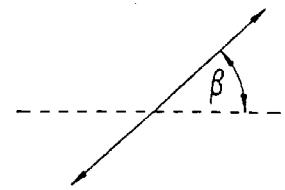
Figure 4A:
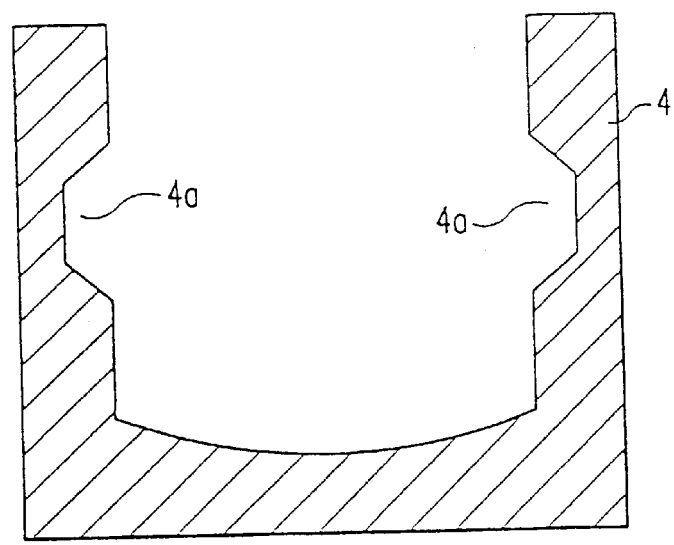
FIG. 4b the workpiece to be generated in a view from above.
Figure 4B:
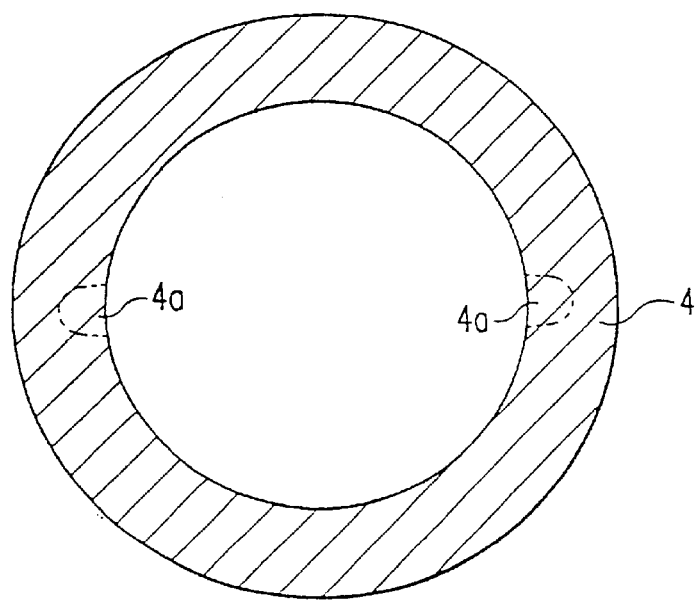

A workpiece, which is to be worked with a wobble die manufactured in accordance with this method is illustrated in FIGS. 4a and 4b. The cylinder-shaped workpiece 4 has a likewise cylinder-shaped bore which has two undercuts 4a. FIG. 4b shows the workpiece in a view from above. The employment of a normal press die for working is not possible in this case since the two oppposing undercuttings 4a are not through-going up to the opening of the workpiece 4 and the press die could no longer in the end be removed from the workpiece 4. The working with the wobble die should here primarily be effected for or shaping of the two undercuttings 4a. In this case, for the working, the straight-line wobble movement in FIG. 2b suggests itself; that is, during the working the wobble die will execute a pendulum motion about a wobble point.

Figure 3:
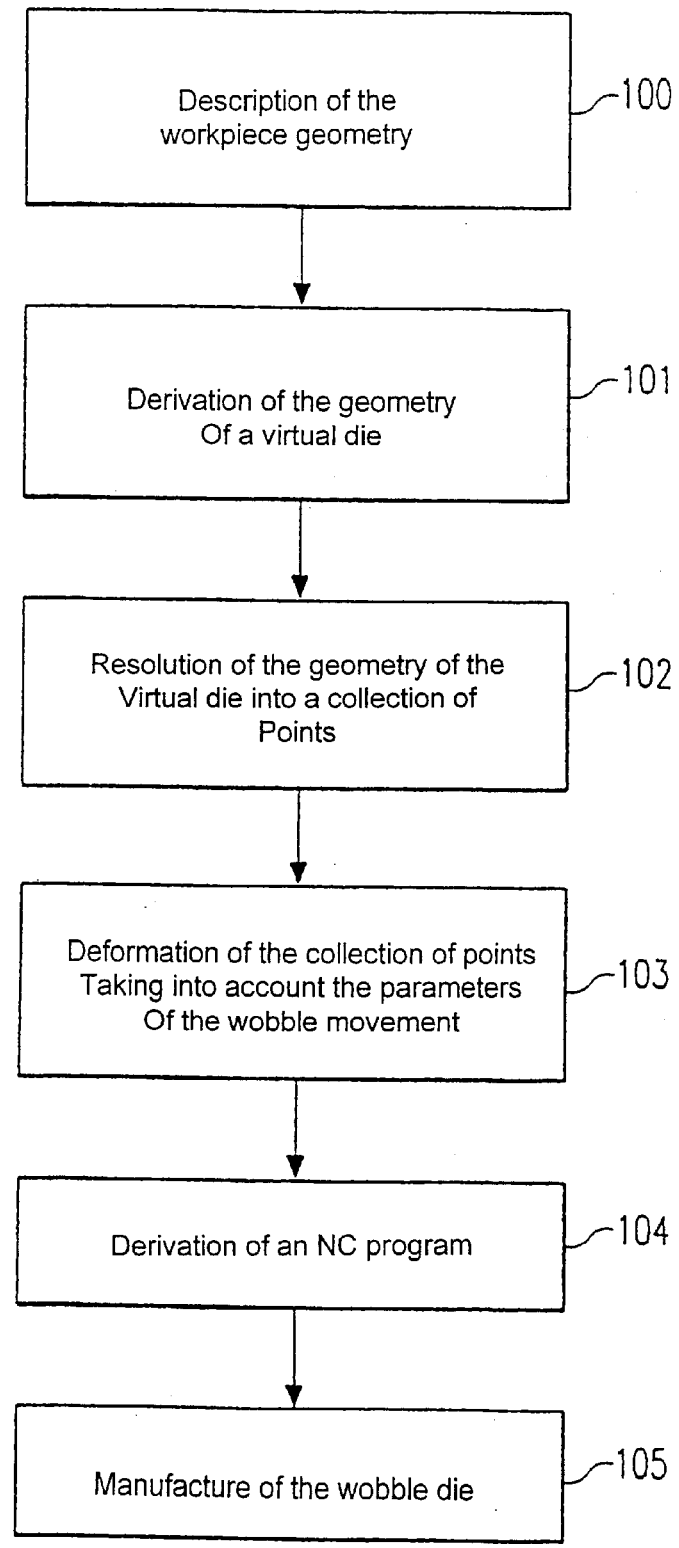
FIG. 3 the flow diagram of a method in accordance with the invention.
Figure 5A:
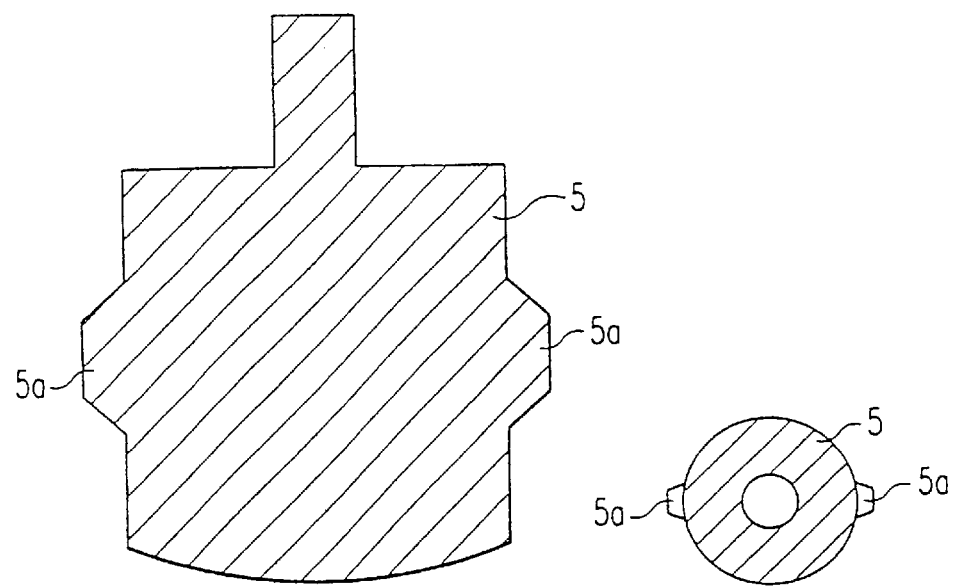
FIG. 5a a virtual die in section and in a view from above (reduced in size)

In the first two steps (100, 101) of the method according to FIG. 3, there is effected the description of the three-dimensional geometry of the workpiece 4 and of the virtual die 5 which in accordance with the description given above completely fills the hollow chamber of the workpiece 4 and the undercuttings 4a. This virtual die, the outer contour of which corresponds to the contour of the workpiece 4, is shown in FIG. 5a. In correspondence to the two recesses 4b of the workpiece, it has two opposing bulges 5a.

Figure 5B:
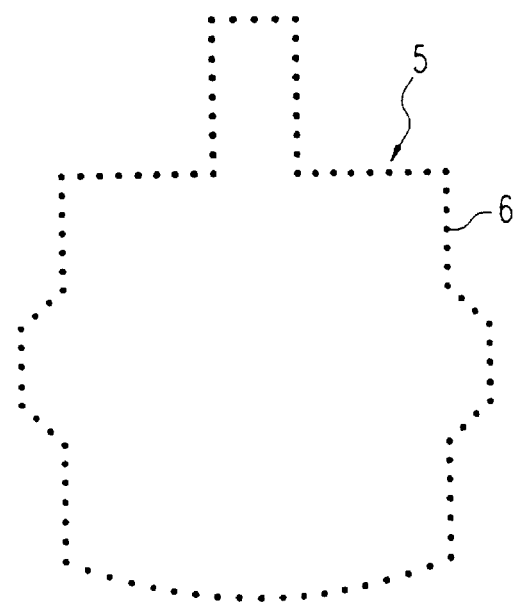
FIG. 5b a point collection of the virtual die.

The method step 102, that is the resolution of the geometry of the virtual die 5 into a collection of points 6 is shown in FIG. 5b. The description of the structure of the virtual die 5 is now effected by means of the three-dimensional coordinates of a finite set of surface points. The number of surface points employed, and correspondingly the average spacing between the individual points, determines the exactitude of the description of the geometry of the virtual, and later of the finished, wobble die. In three-dimensions, this collection of points 6 corresponds to a network of surface points.

Figure 6:
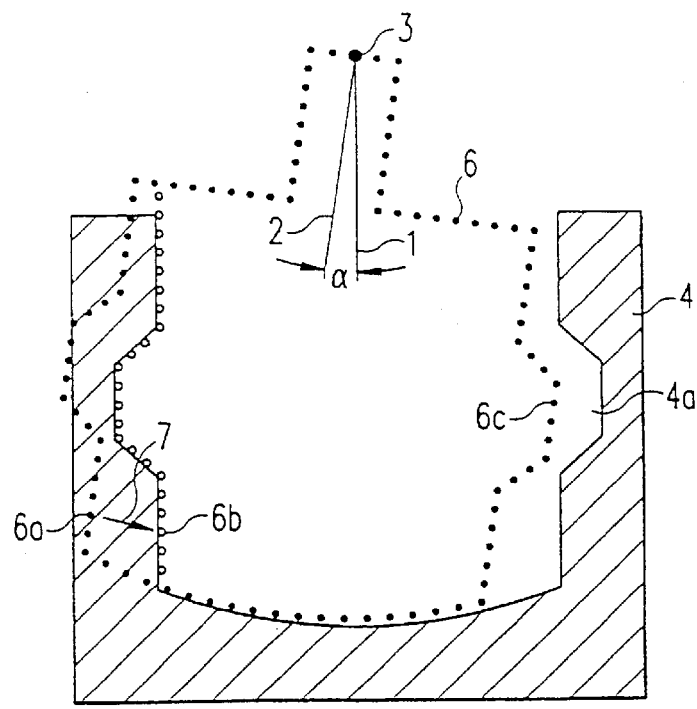
FIG. 6 an illustration of the method step of deforming the die.

The decisive step 103 of the method, namely the deformation of the collection in FIG. 6 of points 6 is illustrated in FIG. 6. In the case of the selected straight-line wobble movement, the wobble die will execute a pendulum movement around the wobble point 3 and thereby be pivoted by the wobble angle $\alpha$ with respect to the central axis 1. This pivoting by the angle $\alpha$ corresponds to a displacement of the surface point 6a. The deformation of the collection of points 6 is now effected by means of the reverse transformation of the surface points, for example a reverse transformation of the point 6a by the vector 7 to the new surface point 6b. Thereby, however, only those surface points 6a are transformed which belong to a surface region of the die which at this moment is actually workpiece 4; that is, is touching the workpiece 4. This means that in the concretely illustrated example in FIG. 6, the collection of points 6 is only deformed on its' left side, whilst the coordinates of the surface points 6c on the right side remain unaltered for the time being.

Figure 7:
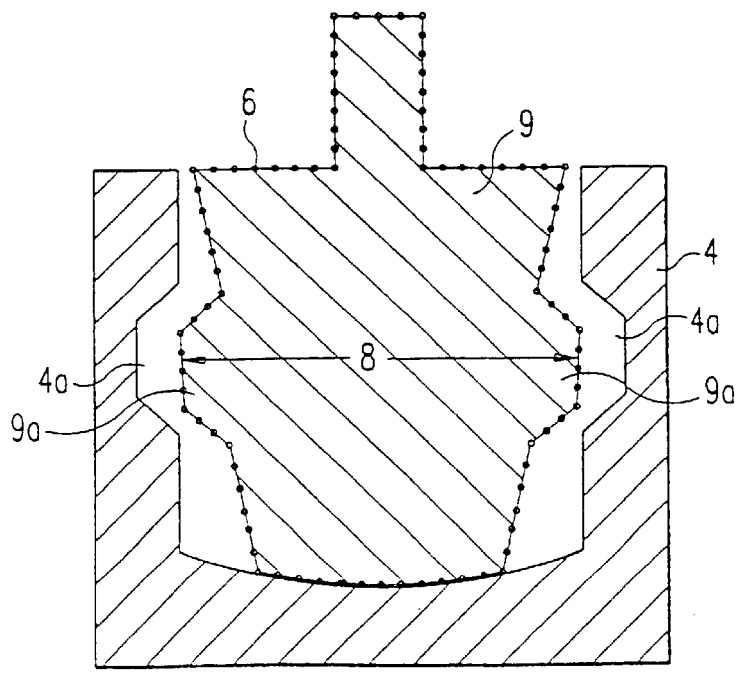
FIG. 7 the finished wobble die.

In the course of the step 103 the surface points 6c on the right side are then also deformed, so that one finally attains a collection of points 6 as illustrated in FIG. 7. Due to the deformation, this collection of points now substantially conical shape, whereby its maximum diameter 8 now no longer exceeds the opening width of bore of the workpiece 4, so that the finished wobble die 9 out of the workpiece 4 without the difficulties. With the aid of the coordinates of the deformed collection of points 6 there can then be produced a corresponding NC program, in order to manufacture the wobble die 9 for example by means of a machining process or by means of erosion.

This method can be extended to significantly more complex workpiece shapes, whereby the effort for carrying out the step 103, that is for the deformation of the collection of points, depends strongly open the geometry of the workpiece and the selected wobble movement. In particular it must be taken into consideration that not every wobble movement is suitable for working of a particular workpiece. With the example of FIGS. 3 to 7 there must for example be selected such a strong pivoting with a wobble angle $\alpha$ that the collection of points is so compressed that its maximum diameter 8 does not exceed a limit value.

Figure 2C:
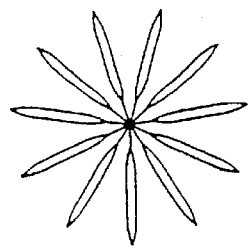
Figure 2D:
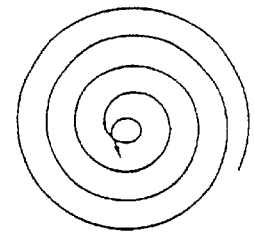

When a suitable wobble movement is selected, the proposed method allows a very simple manufacture of a wobble die, since the deflection of the surface points during the wobble movement can be calculated simply. Thereby, the proposed method is not restricted to the manufacture of the manufacture of spaces wobble dies for the working of hollow spaces. For example, with this method, the wobble die for manufacturing the toothed wheel described in DE 197 44 639, or for manufacturing other wobble dies which work external contours can be manufactured. There must however be available such a wobble movement that it is ensured that a particular point of the workpiece is always worked by means of the same point of the wobble die. Correspondingly, the wobble movements b and c illustrated in FIG. 2 suggest themselves. The angle β of the wobble movement b can naturally be continuously altered, which corresponds to a star-shaped deflection of the wobble die, as is shown in FIG. 2c.

Figure 8:
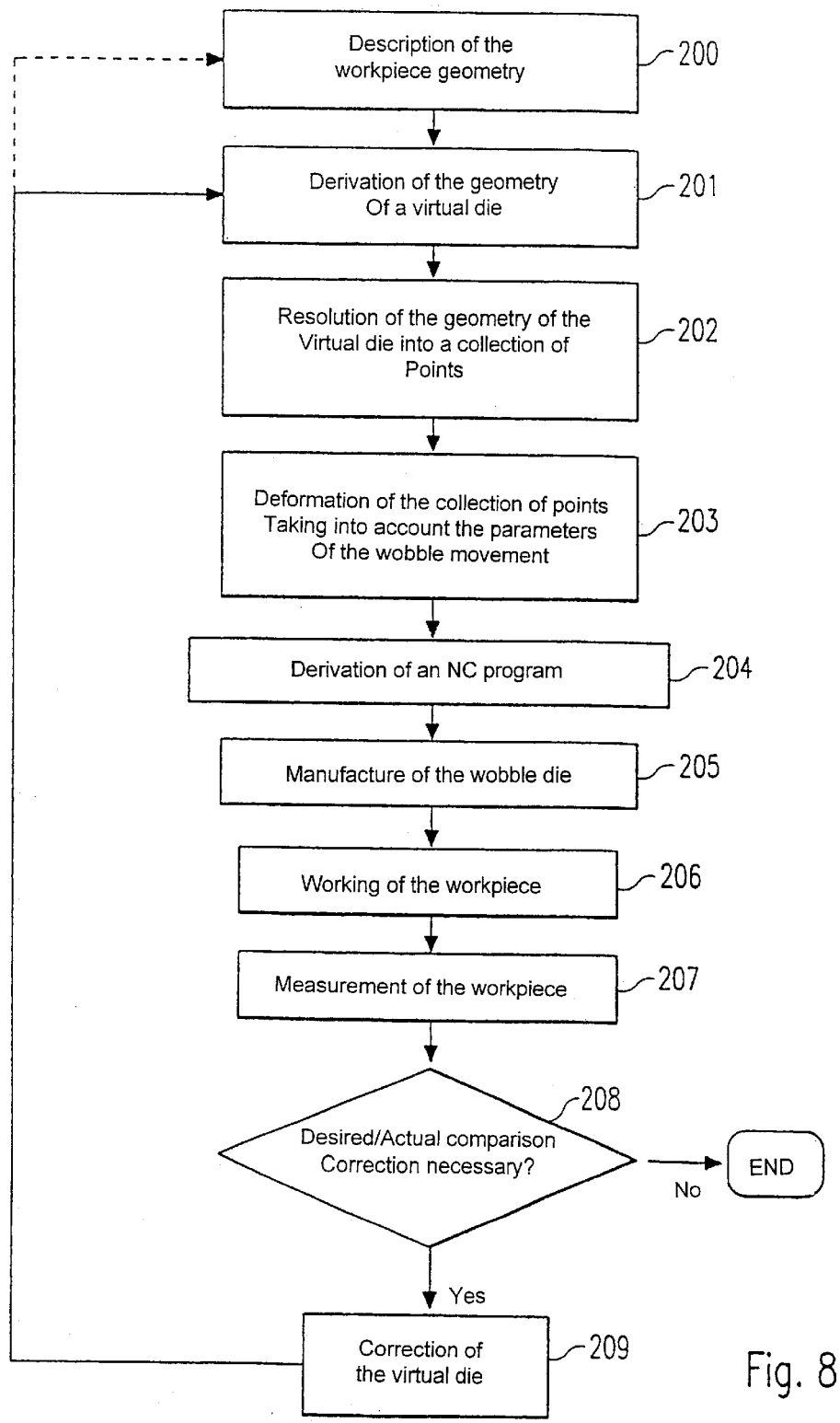
FIG. 8 the flow diagram of an iterative method for step-wise optimization of the wobble die.

An advantage of this method is to be seen in that starting from the desired geometry of the finished workpiece the structure of the wobble die can be found with the aid of simple geometrical calculations, whereby corrections are also possible in a simple manner. This is exploited in an extended method, the scheme of which is illustrated in FIG. 8. Since during the wobble movement both the wobble die and also the workpiece are exposed to a great pressure, during this movement elastic deformations can appear. Thus, a theoretically calculated wobble die may not necessarily lead to the desired tool shape. The method proposed in FIG. 3 can therefore be extended in a simple manner to an iterative method in which the shape of the wobble die is optimized step by step, until the shape of the workpiece worked therewith finally corresponds to the requirements.

Steps 200 to 205 of the iterative method correspond to the steps 100 to 105 of the method illustrated in FIG. 3. Starting from the desired geometry of the workpiece there is thus initially here also a virtual die deformed to a wobble die taking into account the parameters of the wobble movement. In step 206 a workpiece is then worked with the wobble die manufactured in this manner, which workpiece is then measured in step 207. In step 208 a red value/actual value comparison is then carried out, which it is decided whether the quality of the workpiece is satisfactory or whether deviations from the desired workpiece geometry exceed predetermined tolerance limits. If this is the case corrections are carried out at the corresponding points of the virtual die (step 200 or step 201) and then this is carried forth with method step 202, that is with the description of the geometry of the now altered virtual die by means of a collection of points.

Figure 9:
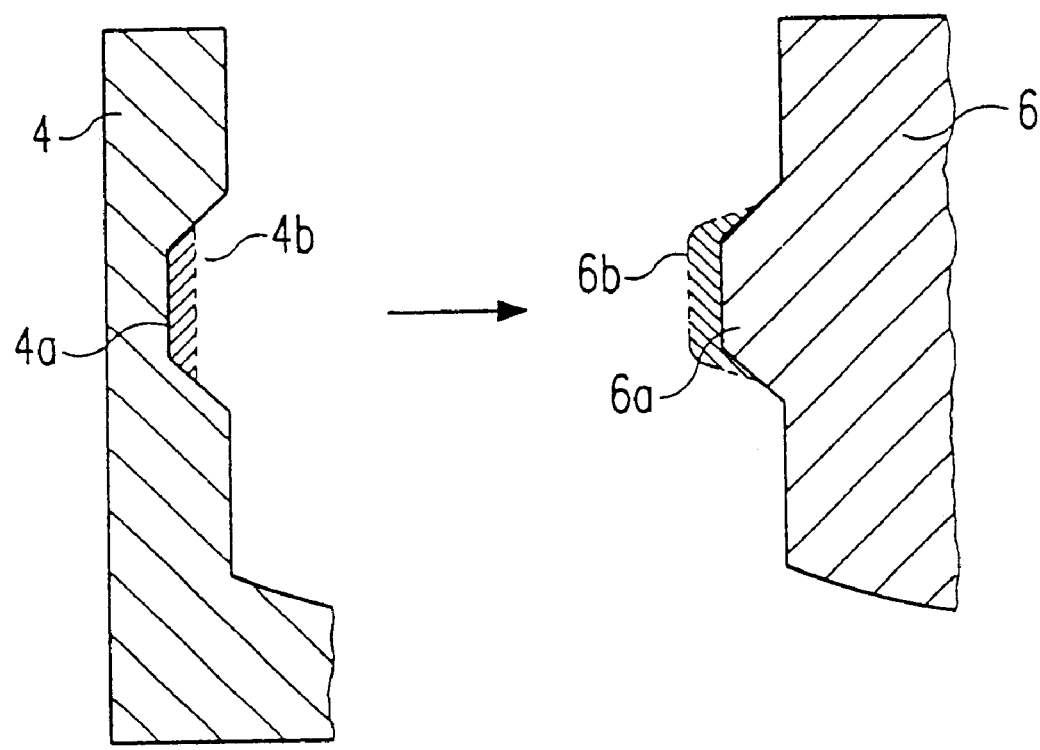
FIG. 9 an illustration of the correction step of the iterative method.

The manner of proceeding during the method step 209 is illustrated in FIG. 9. For example, upon the wobbling out of the workpiece 4 known from FIGS. 4 to 7, there can arise an elastic deformation of the projecting bulge 9a of the wobble die 9, so that the actually achieved depth 4b of the recess does not correspond with the desired depth 4a. Correspondingly, in step 209, the projected bulging 6a of the wobble die 6 is extended so that a new projecting bulging 6b is provided. With the virtual wobble die 6 corrected in this manner, the method continued in step 202. The newly worked workpiece will now have a recess which corresponds more closely to geometry. If the result is still not satisfactory, the loop of method steps 200 or 201 to 209 is carried through for so long until the deviations finally fall below predetermined fault tolerances. Thereby, in method step 209, in each case the last employed virtual wobble die is corrected.

In this manner, within a few loop executions and with slight additional effort, a wobble die can be manufactured which is suitable for working the desired workpiece geometry. The particular advantage of this extended method is to be seen in that a suitable wobble die can be attained without knowledge of the distortion laws which are provided by the kinematics of the wobble process. Elastic deformations of the tool and of the workpiece can thus be compensated in simple manner.

What is claimed is:

1. Method of manufacturing a wobble die for shaping the internal contour or the external contour of a workpiece in a wobble process, whereby the manufacturing method has the following steps:

a) selecting a wobble movement;
b) describing the three-dimensional geometry of the shaped workpiece;
c) prescribing the three-dimensional geometry of a virtual die, the shape of which corresponds in substance to the negative shape of the geometry of the shaped workpiece;
d) deforming the geometry of the virtual die, taking into account the parameters of the selected wobble movement, to a geometry describing the wobble die; and
e) producing a wobble die on the basis of the geometry obtained in step d.

2. Method according to claim 1, characterized in that, the description of the geometry of the workpiece and of the virtual die is effected with the aid of a CAD program.

3. Method according to claim 1, characterized in that, the production of the wobble die is effected with the aid of an NC program derived in accordance with the geometry obtained in step d.

4. Method according to claim 1, characterized in that, the wobble is produced by at least one of a machining process and an erosion process.

5. Method according to claim 1, characterized in that, for deforming the geometry of the virtual die, the structure of which is described by a finite number of surface points and their coordinates, transformation is effected taking into account the deflection during the wobble movement.

6. Method according to claim 1, characterized in that, the method additionally has the following steps:

f) working of a preliminary workpiece by the wobble die;
g) measurement of the worked workpiece and desired value/actual value comparison with the desired workpiece geometry;
h) correction of the geometry of the last deformed virtual die and resumption of the method in step d, if the result of the desired/actual-value comparison indicates that the deviations between the worked workpiece and the desired workpiece geometry exceed predetermined tolerance limits;

the steps d to h being repeatedly carried through for so long until the result of the desired-value/actual-value comparison indicates that the deviations between the worked workpiece and the desired workpiece geometry do not exceed predetermined tolerance limits.

7. Method according to claim 1, characterized in that, a wobble movement is selected with which the workpiece carries out a driven rotational movement around the machine axis and the wobble die rotates therewith around the wobble axis inclined by a wobble angle α, synchronously with the rotational movement of the workpiece.

8. Method according to claim 7, characterized in that, the rotational movement of the wobble die is additionally driven.

9. Method according to claim 7, characterized in that, wobble angle α=0° applies.

10. Method according to claim 1, characterized in that, a wobble movement is selected with which the workpiece is stationary and the wobble die carries out at the same time a rotation around the wobble axis, a wobble movement about the machine axis and a stroke movement in axial direction.

11. Method according to claim 1, characterized in that, a wobble movement is selected with which the workpiece carries out a stroke movement in axial direction and the wobble die carries out at the same time a rotation around the wobble axis and a wobble movement about the machine axis.

* * * * *

UNITED STATES PATENT AND TRADEMARK OFFICE
CERTIFICATE OF CORRECTION

PATENT NO. : 6,850,813 B1
DATED : February 1, 2005
INVENTOR(S) : Michael Dahme

It is certified that error appears in the above-identified patent and that said Letters Patent is hereby corrected as shown below:

<u>Title page, Item [54] and Column 1, line 1,</u>
Title, please delete "METHOD OF PRODUCING A WOBBLE DIE" and insert
-- METHOD OF MANUFACTURING A WOBBLE DIE --.

Signed and Sealed this

Twenty-sixth Day of July, 2005

JON W. DUDAS
*Director of the United States Patent and Trademark Office*